US012485931B2

(12) United States Patent
Ito et al.

(10) Patent No.: US 12,485,931 B2
(45) Date of Patent: Dec. 2, 2025

(54) AUTOMATIC TRAVELLING CONTROL SYSTEM, AUTOMATIC TRAVELLING CONTROL METHOD AND RECORDING MEDIUM

(71) Applicant: Panasonic Intellectual Property Management Co., Ltd., Osaka (JP)

(72) Inventors: Yukiko Ito, Kyoto (JP); Kazuhiko Maeda, Osaka (JP); Tomoka Ishibashi, Osaka (JP); Takaaki Seki, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 300 days.

(21) Appl. No.: 17/677,514

(22) Filed: Feb. 22, 2022

(65) Prior Publication Data
US 2022/0315059 A1   Oct. 6, 2022

(30) Foreign Application Priority Data

Mar. 30, 2021   (JP) .................................. 2021-058250
Mar. 30, 2021   (JP) .................................. 2021-058276

(51) Int. Cl.
  *B60W 50/02*   (2012.01)
  *B60W 50/14*   (2020.01)
  *B60W 60/00*   (2020.01)
(52) U.S. Cl.
  CPC .... *B60W 60/0053* (2020.02); *B60W 50/0205* (2013.01); *B60W 50/14* (2013.01); *B60W 2050/143* (2013.01); *B60W 2050/146* (2013.01)

(58) Field of Classification Search
  CPC ......... B60W 60/0053; B60W 50/0205; B60W 50/14; B60W 2050/143; B60W 2050/146
  (Continued)

(56) References Cited

U.S. PATENT DOCUMENTS

2009/0157252 A1 * 6/2009 Saen .................... G07C 5/0816
                                                    701/31.4
2011/0160985 A1 * 6/2011 Yamaguchi ....... B60W 50/0205
                                                    701/112
(Continued)

FOREIGN PATENT DOCUMENTS

CN   109298719 A  *  2/2019  .......... G05D 1/0214
JP   6557843          8/2019
JP   6668814          3/2020

*Primary Examiner* — Rachid Bendidi
*Assistant Examiner* — Hossam M Abd El Latif
(74) *Attorney, Agent, or Firm* — Greenblum & Bernstein, P.L.C.

(57) ABSTRACT

An automatic travelling control system includes: a function determiner that determines a status of a function used for automatic travelling of a vehicle; a first notifier that provides a notification of the status of the function; a first abnormality detector that detects an abnormality in the notification of the status of the function; a second notifier that provides a predetermined notification when the abnormality in the notification of the status of the function is detected and it is determined that the function is normal; a second abnormality detector that detects an abnormality in the predetermined notification; a manual driving capability determiner that determines whether a user on board the vehicle can drive the vehicle manually; and a manual driving requester that requests the user to drive the vehicle manually when the second notifier provides the predetermined notification and it is determined that the user can drive the vehicle manually.

14 Claims, 6 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2018/0074510 A1* | 3/2018 | Isaji | G08G 1/0968 |
| 2020/0180502 A1 | 6/2020 | Mitsuya et al. | |
| 2020/0317213 A1* | 10/2020 | Oba | B60K 35/29 |
| 2021/0039654 A1* | 2/2021 | Morimoto | B60W 50/14 |

* cited by examiner

AUTOMATIC TRAVELLING CONTROL SYSTEM, AUTOMATIC TRAVELLING CONTROL METHOD AND RECORDING MEDIUM

CROSS REFERENCE TO RELATED APPLICATIONS

The present application is based on and claims priority of Japanese Patent Application No. 2021-058250 filed on Mar. 30, 2021, and Japanese Patent Application No. 2021-058276 filed on Mar. 30, 2021.

FIELD

The present disclosure relates to an automatic travelling control system, an automatic travelling control method, and a recording medium.

BACKGROUND

Conventionally, an automatic travelling control device, which notifies the status of the function used for automatic travelling by the display of the car navigation system or the like, and notifies an abnormality in the notification of the status of the function used for automatic travelling by another display or the like when the abnormality in the notification of the status of the function used for automatic travelling is detected, is disclosed (for example, Patent Literature (PTL) 1. When an abnormality in the notification of the status of the function used for automatic travelling occurs, the status of the function used for automatic travelling will not be notified correctly, so that the user may be worried that an abnormality may also occur in the function used for automatic travelling. However, in PTL 1 described above, since the abnormality in the notification of the status of the function used for automatic travelling is notified, the user can recognize that it is not the abnormality in the function used for automatic travelling but the abnormality in the notification of the status of the function used for automatic travelling.

CITATION LIST

Patent Literature

PTL 1: Japanese Patent No. 6668814

SUMMARY

However, the automatic travelling control device according to PTL 1 can be improved upon.

In view of this, the present disclosure provides an automatic travelling control system or the like capable of improving upon the above related art.

The automatic travelling control system according to one aspect of the present disclosure includes: an automatic travelling controller that controls automatic travelling of a vehicle; a function determiner that determines a status of a function used for automatic travelling of the vehicle; a first notifier that provides notification of the status of the function; a first abnormality detector that detects an abnormality in the notification of the status of the function; a second notifier that provides predetermined notification when the abnormality in the notification of the status of the function is detected and it is determined that the function is normal; a second abnormality detector that detects an abnormality in the predetermined notification; a manual driving capability determiner that determines whether a user on board the vehicle is capable of driving the vehicle manually; and a manual driving requester that requests the user to drive the vehicle manually when the second notifier provides the predetermined notification and it is determined that the user is capable of driving the vehicle manually.

The automatic travelling control method according to one aspect of the present disclosure includes: determining whether a function used for automatic travelling of a vehicle is normal; providing notification of a status of the function; detecting an abnormality in the notification of the status of the function; providing predetermined notification when the abnormality in the notification of the status of the function is detected and it is determined that the function is normal; detecting an abnormality in the predetermined notification; determining whether the user on board the vehicle is capable of driving the vehicle manually; and requesting the user to drive the vehicle manually when the predetermined notification is provided in the providing of the predetermined notification and it is determined that the user is capable of driving the vehicle manually.

The recording medium according to one aspect of the present disclosure is a computer-readable non-transitory recording medium having recorded thereon a program for causing a computer to execute the automatic travelling control method described above.

An automatic travelling control system or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
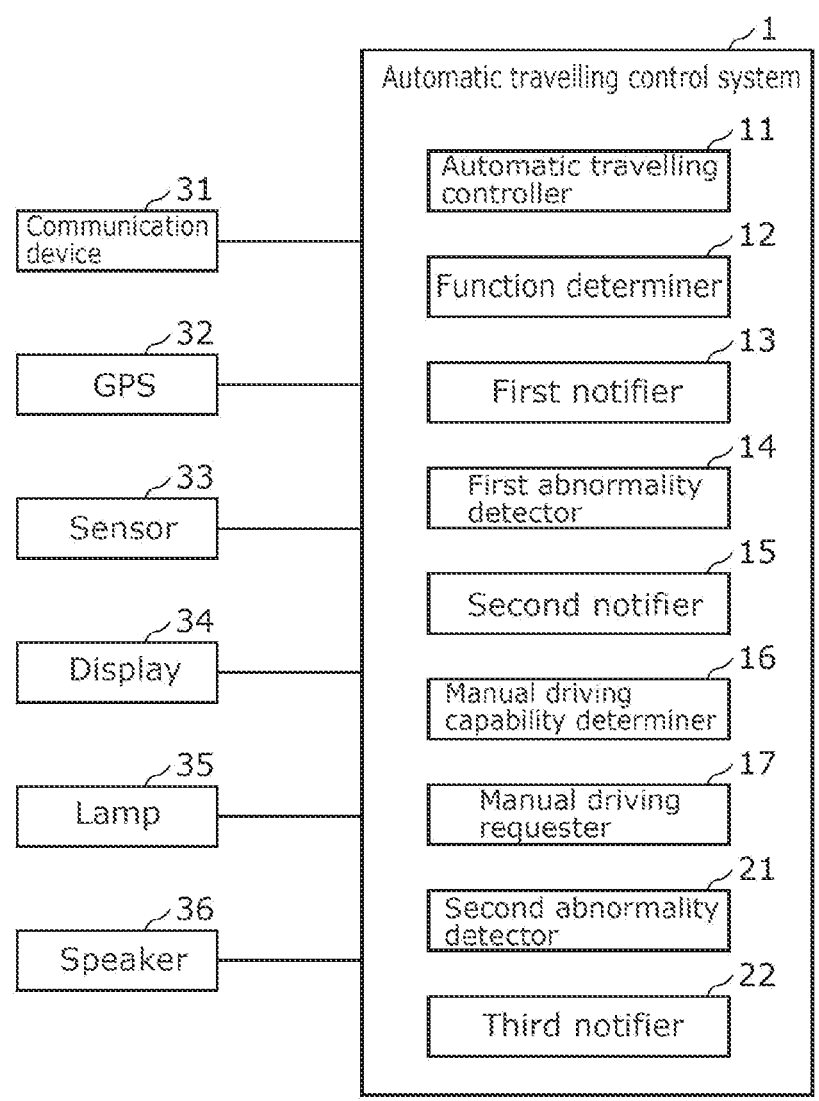
FIG. 1 is a configuration diagram showing an example of an automatic travelling control system according to Embodiment 1.

DESCRIPTION OF EMBODIMENTS (Underlying Knowledge Forming Basis of the Present Disclosure)

The present inventors have found that the following problems occur with respect to the automatic travelling control device described in the section of "Background".

For example, an abnormality may occur in the notification of an abnormality in the notification of the status of the function used for automatic travelling. In this case, an abnormality has occurred in the notification of the status of the function used for automatic travelling, and furthermore, an abnormality has also occurred in the notification of the abnormality, so that the user may be worried that an abnormality may also occur in the function used for automatic travelling.

In order to solve such a problem, the automatic travelling control system according to one aspect of the present disclosure includes: an automatic travelling controller that controls automatic travelling of a vehicle; a function determiner that determines a status of a function used for automatic travelling of the vehicle; a first notifier that provides notification of the status of the function; a first abnormality detector that detects an abnormality in the notification of the status of the function; a second notifier that provides predetermined notification when the abnormality in the notification of the status of the function is detected and it is determined that the function is normal; a second abnormality detector that detects an abnormality in the predetermined notification; a manual driving capability determiner that determines whether a user on board the vehicle is capable of driving the vehicle manually; and a manual driving requester that requests the user to drive the vehicle manually when the second notifier provides the predetermined notification and it is determined that the user is capable of driving the vehicle manually.

Accordingly, an abnormality in the predetermined notification (for example, the notification of an abnormality in the notification of the status of the function used for automatic travelling) is detected, so that it is possible to deal with the abnormality in the predetermined notification.

For example, the automatic travelling control system may further include a third notifier that provides notification when the abnormality in the predetermined notification is detected. For example, the third notifier may provide the notification of the abnormality in the predetermined notification. In addition, for example, the third notifier may provide the notification of the status of the function.

When the notification of the abnormality in the predetermined notification is provided, the user can recognize that an abnormality in the predetermined notification has occurred, not an abnormality in the function used for automatic travelling. In addition, when the notification of the status of the function used for automatic travelling is provided, the user can recognize the status of the function used for automatic travelling by the third notifier even if an abnormality occurs in the notification of the function used for automatic travelling by the first notifier.

For example, a priority is associated with a content of the notification provided by the third notifier, and the third notifier may provide the notification according to the priority.

Depending on the equipment for being caused to provide the notification, the amount of information that can be notified is limited, and if there are a plurality of contents of the notification, it may not be possible to notify the plurality of contents of the notification at the same time. Therefore, by providing the notification according to the priority associated with the content of the notification, it is possible to preferentially notify the content of the notification having a high priority.

For example, the third notifier may provide the notification by means according to a type of equipment which is caused to provide the notification.

There are lamps, speakers, displays of various sizes and the like as equipment for being caused to provide the notification, and it is difficult to provide the notification thereto by a uniform means. Therefore, by providing the notification by means according to the type of equipment, it is possible to cause various equipment to provide the notification.

For example, the means includes sound and display, and the third notifier may provide the notification by sound or display depending on the content of the notification.

For example, when it is possible to notify by sound and display, the notification may be provided by sound or display depending on the content of the notification.

For example, the automatic travelling control system may further include a third abnormality detector that detects an abnormality in the notification provided by the third notifier.

Accordingly, since an abnormality in the notification provided by the third notifier is detected, it is possible to deal with the abnormality in the notification provided by the third notifier.

For example, the automatic travelling control system may further include a fourth notifier that provides the notification when the abnormality in the notification provided by the third notifier is detected.

Accordingly, the user can recognize the abnormality in the notification provided by the third notifier.

The automatic travelling control method according to one aspect of the present disclosure includes: determining whether a function used for automatic travelling of a vehicle is normal; providing a notification of a status of the function; detecting an abnormality in the notification of the status of the function; providing a predetermined notification when the abnormality in the notification of the status of the function is detected and it is determined that the function is normal; detecting an abnormality in the predetermined notification; determining whether the user on board the vehicle is capable of driving the vehicle manually; and requesting the user to drive the vehicle manually when the predetermined notification is provided in the providing of the predetermined notification and it is determined that the user is capable of driving the vehicle manually.

Accordingly, since the abnormality in the predetermined notification is detected, it is possible to deal with the abnormality in the predetermined notification.

The recording medium according to one aspect of the present disclosure is a computer-readable non-transitory recording medium having recorded thereon a program for causing a computer to execute the automatic travelling control method described above.

Accordingly, since the abnormality in the predetermined notification is detected, it is possible to deal with the abnormality in the predetermined notification.

In addition, in the automatic travelling control device of PTL 1, automatic travelling is continued when it is determined that the user on board the vehicle is not capable of driving manually after the notification of the abnormality in the notification of the status of the function used for automatic travelling. However, if an abnormality occurs in the function used for automatic travelling during the continuation of the automatic travelling, the abnormality in the notification of the status of the function used for automatic travelling is detected, and the abnormality in the function used for automatic travelling cannot be notified, so that the automatic travelling will be continued without the user being able to recognize the abnormality in the function used for automatic travelling.

In order to solve such a problem, the automatic travelling control system according to one aspect of the present disclosure includes: an automatic travelling controller that controls automatic travelling of a vehicle; a function determiner that determines whether a function used for automatic travelling of the vehicle is normal; a first notifier that provides a notification of the status of the function; a first abnormality detector that detects an abnormality in the notification of the status of the function; a second notifier that provides a predetermined notification when the abnormality in the notification of the status of the function is detected and it is determined that the function is normal; a manual driving capability determiner that determines whether a user on board the vehicle is capable of driving the vehicle manually; a manual driving requester that requests the user to drive the vehicle manually when the second notifier provides the predetermined notification and it is determined that the user is capable of driving the vehicle manually; and a third notifier that provides the notification of the abnormality in the function when it is determined that the function is abnormal during the continuation of the automatic travelling of the vehicle, wherein when the second notifier provides the predetermined notification and it is determined that the user is not capable of driving the vehicle manually, or when the manual driving is not started after the user is requested to drive the vehicle manually, the automatic travelling controller continues the automatic travelling of the vehicle.

Accordingly, when it is determined that the function used for automatic travelling is abnormal during the continuation of the automatic travelling of the vehicle after the abnormality in the notification of the status of the function used for automatic travelling is notified, the abnormality in the function used for automatic travelling is notified. For this reason, the user can deal with the abnormality in the function used for automatic travelling even if the abnormality in the function used for automatic travelling occurs during the continuation of the automatic travelling of the vehicle after the abnormality in the notification of the status of the function used for automatic travelling is notified.

For example, the automatic travelling control system may further include an automatic travelling continuation notifier that provides a notification of the continuation of automatic travelling when it is determined that the user is not capable of driving the vehicle manually.

Accordingly, the user can recognize that the automatic travelling is continued.

For example, the third notifier may provide the notification of the abnormality in the function by means according to the type of equipment which is caused to provide the notification of the abnormality in the function.

There are lamps, speakers, displays of various sizes and the like as equipment for being caused to provide the notification, and it is difficult to provide the notification thereto by a uniform means. Therefore, by providing the notification of the abnormality in the function used for automatic travelling by means according to the type of equipment, it is possible to cause various equipment to provide the notification.

For example, the means includes sound and display, and the third notifier may provide the notification of the abnormality in the function by sound or display depending on the content of the notification.

For example, when it is possible to notify by sound and display, the notification may be provided by sound or display depending on the content of the notification.

For example, there may be a plurality of types of the functions, and a priority may be associated with each of the plurality of types of the functions, and the third notifier may provide the notification of the abnormalities of the functions according to the priority.

Depending on the equipment for being caused to provide the notification, the amount of information that can be notified is limited, and when abnormalities in a plurality of types of the functions used for of automatic travelling occur, it may not be possible to notify the abnormalities in a plurality of types of functions at the same time. Therefore, by providing the notification of the abnormality in the function used for automatic travelling according to the priority associated with each of the plurality of types of the functions, it is possible to preferentially notify the abnormality in the function having a high priority.

For example, the plurality of types of the functions include the functions to which different priorities are associated according to the travelling status of the vehicle, and the third notifier may provide the notification of the abnormalities in the functions used for automatic travelling of the vehicle according to the priority and the travelling status of the vehicle.

Since a function that the importance changes depending on the travelling status of the vehicle exists in the function used for automatic travelling of the vehicle, a different priority may be associated with the function used for automatic travelling according to the driving status of the vehicle. Then, by providing the notification of the abnormality in the function used for automatic travelling according to the priority and the travelling status, it is possible to preferentially notify the function having a high priority in the current travelling status of the vehicle.

For example, the automatic travelling control system may further include a third abnormality detector that detects an abnormality in the notification provided by the third notifier.

Accordingly, an abnormality in the notification provided by the third notifier is detected, so that it is possible to deal with the abnormality in the notification provided by the third notifier.

For example, the automatic travelling control system may further include a fourth notifier that provides a notification when an abnormality in the notification provided by the third notifier is detected.

Accordingly, the user can recognize the abnormality in the notification provided by the third notifier.

The automatic travelling control method according to one aspect of the present disclosure includes: determining whether a function used for automatic travelling of a vehicle is normal; providing a notification of a status of the function; detecting an abnormality in the notification of the status of the function; providing a predetermined notification when the abnormality in the notification of the status of the function is detected and it is determined that the function is normal; determining whether the user on board the vehicle is capable of driving the vehicle manually; requesting the user to drive the vehicle manually when the predetermined notification is provided in the providing of the predetermined notification and it is determined that the user is capable of driving the vehicle manually; continuing automatic travelling of the vehicle when the predetermined notification is provided in the providing of the predetermined notification and it is determined that the user is not capable of driving the vehicle manually, or when the manual driving is not started after the user is requested to drive the vehicle manually; and providing the notification of an abnormality in the function when it is determined that the function during a continuation of the automatic travelling of the vehicle in the continuing.

Accordingly, when it is determined that the function used for automatic travelling is abnormal during the continuation of automatic travelling of the vehicle after the abnormality in the notification of the status of the function used for automatic travelling is notified, the abnormality in the function used for automatic travelling is notified. For this reason, the user can deal with the abnormality in the function used for automatic travelling even if an abnormality occurs in the function used for automatic travelling during the continuation of the automatic travelling of the vehicle after the abnormality in the notification of the status of the function used for automatic travelling is notified.

The recording medium according to one aspect of the present disclosure is a computer-readable non-transitory recording medium having recorded thereon a program for causing a computer to execute the automatic travelling control method described above.

Accordingly, when it is determined that the function used for automatic travelling is abnormal during the continuation of the automatic travelling of the vehicle after the abnormality in the notification of the status of the function used for automatic travelling is notified, the abnormality in the function used for automatic travelling is notified. For this reason, the user can deal with the abnormality in the function for automatic travelling even if an abnormality occurs in the function used for automatic travelling during the continuation of the automatic travelling of the vehicle after the abnormality in the notification of the status of the function used for automatic travelling is notified.

Hereinafter, embodiments will be specifically described with reference to the drawings.

It should be noted that all of the embodiments described below are comprehensive or specific examples. Numerical values, shapes, materials, components, arrangement positions and connection forms of components, steps, order of steps, and the like shown in the following embodiments are examples, and are not intended to limit the present disclosure. In addition, among the components in the following embodiments, the components not described in the independent claims indicating the broadest concept are described as arbitrary components. In addition, each figure is a schematic view and is not necessarily exactly illustrated. In addition, in each figure, the same configuration members are designated by the same reference numerals.

Embodiment 1

Hereinafter, the automatic travelling control system according to Embodiment 1 will be described with reference to the drawings.

FIG. 1 is a configuration diagram showing an example of automatic travelling control system 1 according to Embodiment 1. It should be noted that FIG. 1 also shows communication device 31, global positioning system (GPS) 32, sensor 33, display 34, lamp 35, and speaker 36. Communication device 31, GPS 32, sensor 33, display 34, lamp 35, and speaker 36 may be included in automatic travelling control system 1. Communication device 31, GPS 32, sensor 33, display 34, lamp 35 and speaker 36 are mounted on the vehicle.

Communication device 31 is a communication interface for wireless communication with a control center or the like. The control center is a center-type device that manages the automatic travelling of the vehicle. It should be noted that communication device 31 may perform wireless communication with another vehicle, a roadside unit, or the like.

GPS 32 is a system that obtains the position information of the vehicle.

Sensor 33 is an image sensor (camera), a millimeter-wave radar, a light detection and ranging (LiDAR), or the like, and can detect obstacles around the vehicle.

Display 34 is a display that can be visually recognized by a user on board a vehicle, and is, for example, a car navigation system display, a head-up display (HUD), an instrument cluster (IC) display, a passenger display, an electronic mirror, or the like. Display 34 can provide various notifications described later by displaying characters and the like.

Lamp 35 is a lamp that can be visually recognized by a user on board the vehicle, and is, for example, a room lamp provided around the driver's seat. Lamp 35 can provide various notifications described later by the number of blinks, the color emitted, and the like.

Speaker 36 outputs sound in the vehicle. Speaker 36 can provide various notifications described later by sound output.

Automatic travelling control system 1 is a system for controlling automatic travelling of the vehicle, and includes automatic travelling controller 11, function determiner 12, first notifier 13, first abnormality detector 14, second notifier 15, manual driving capability determiner 16, manual driving requester 17, second abnormality detector 21, and third notifier 22. Automatic travelling control system 1 is a computer including a processor, a memory, and the like. The memory is a read only memory (ROM), a random access memory (RAM), or the like, and can store a program executed by the processor. Automatic driving controller 11, function determiner 12, first notifier 13, first abnormality detector 14, second notifier 15, manual driving capability determiner 16, manual driving requester 17, second abnormality detector 21 and third notifier 22 are realized by a processor or the like that executes a program stored in the memory. Automatic travelling control system 1 may be a device mounted on a vehicle. In this case, the components included in automatic travelling control system 1 may be arranged in one device (one housing) in the vehicle, or may be distributed and arranged in a plurality of devices in the vehicle. In addition, automatic travelling control system 1 may be a server provided outside the vehicle. In this case, the components included in automatic travelling control system 1 may be distributed and arranged on a plurality of servers. For example, when automatic travelling control system 1 is a control center (for example, a server), the vehicle wirelessly communicates with automatic travelling control system 1 via communication device 31. In addition, when automatic travelling control system 1 is mounted on the vehicle, automatic travelling control system 1 wirelessly communicates with the control center via communication device 31. In addition, the components included in automatic travelling control system 1 may be distributed and arranged in the device inside the vehicle and the server provided outside the vehicle.

Automatic travelling controller 11 controls automatic travelling of the vehicle. The functions used by automatic travelling controller 11 for automatic travelling of the vehicle are, for example, a function of communication device 31 for wireless communication with a control center and the like, a function of GPS 32 for obtaining the position information of the vehicle, and a function of sensor 33 for obtaining peripheral information such as obstacles around the vehicle.

Function determiner 12 determines the status of the function used for automatic travelling of the vehicle. Function determiner 12 determines whether the function used for automatic travelling of the vehicle is normal or abnormal. For example, function determiner 12 can determine the status of the function used for automatic travelling of the vehicle by checking the signals processed by various electronic control units (ECUs) related to communication device 31, GPS 32, and sensor 33.

First notifier 13 provides the notification of the determined status of the function used for automatic travelling of the vehicle. For example, first notifier 13 causes equipment such as display 34, lamp 35, speaker 36, or the like to provide the notification of the status of a function used for automatic travelling of a vehicle.

First abnormality detector 14 detects an abnormality in the notification of the status of the function used for automatic travelling of the vehicle. For example, first abnormality detector 14 can detect the abnormality in the notification of the status of the function used for automatic travelling of the vehicle by checking the signal processed by the ECU or the like related to the equipment that provides a notification of the status of the function used for automatic travelling of the vehicle. For example, first abnormality detector 14 detects whether it is an abnormality in the signal output from first notifier 13, an abnormality on the equipment side that actually provides the notification, or an abnormality on the path between first notifier 13 and the equipment.

Second notifier 15 provides a predetermined notification when an abnormality in the notification of the status of the function used for automatic travelling of the vehicle is detected and it is determined that the function used for automatic travelling of the vehicle is normal. The predetermined notification is, for example, a notification of an abnormality in the notification of the status of the function used for automatic travelling of the vehicle. For example, second notifier 15 causes equipment such as display 34, lamp 35, or speaker 36 to provide a predetermined notification. Second notifier 15 may cause equipment other than the equipment, which is caused to provide the notification by first notifier 13, to provide the predetermined notification. This is because an abnormality has been detected in the notification of the status of the function used for automatic travelling of the vehicle by first notifier 13, and there is a possibility that an abnormality has occurred in the equipment which is caused to provide the notification by first notifier 13.

It should be noted that when first notifier 13 causes a plurality of equipment (for example, display 34, speaker 36, and the like) to provide the notification, and an abnormality occurs in only some of the equipment, second notifier 15 may cause the equipment, in which no abnormality has occurred among the equipment which is caused to provide the notification by first notifier 13, to provide a predetermined notification.

Manual driving capability determiner 16 determines whether the user on board the vehicle is capable of driving the vehicle manually. The method of determining whether the user on board the vehicle is capable of driving the vehicle manually will be described later.

Manual driving requester 17 requests the user to drive the vehicle manually when second notifier 15 provides a predetermined notification and it is determined that the user is capable of driving the vehicle manually. For example, manual driving requester 17 requests the user to drive the vehicle manually via equipment such as display 34, lamp 35, or speaker 36. Manual driving requester 17 may request the user to drive the vehicle manually via equipment other than the equipment which is caused to provide the notification by first notifier 13. This is because an abnormality in the notification of the status of the function used for automatic travelling of the vehicle by first notifier 13 has been detected, and there is a possibility that an abnormality has occurred in the equipment which is caused to provide the notification by first notifier 13.

It should be noted that when first notifier 13 causes a plurality of equipment (for example, display 34, speaker 36, and the like) to provide the notification, and an abnormality occurs in only some of the equipment, manual driving requester 17 may cause the equipment, in which no abnormality has occurred among the equipment which is caused to provide the notification by first notifier 13, to provide a predetermined notification Second abnormality detector 21 detects an abnormality in a predetermined notification. For example, second abnormality detector 21 can detect an abnormality in a predetermined notification by checking the signal processed by an ECU or the like related to the equipment providing the predetermined notification. For example, second abnormality detector 21 detects whether it is an abnormality in the signal output from second notifier 15, an abnormality on the equipment side that actually provides the notification, or an abnormality on the path between second notifier 15 and the equipment.

Third notifier 22 notifies when an abnormality in the predetermined notification is detected. For example, third notifier 22 provides a notification of an abnormality in the predetermined notification. For example, third notifier 22 causes equipment such as display 34, lamp 35, or speaker 36 to provide the notification of an abnormality in the predetermined notification. Third notifier 22 may cause equipment other than the equipment, which is caused to provide the notification by first notifier 13, and the equipment, which is caused to provide the notification by second notifier 15, to provide the notification of the abnormality in the predetermined notification. This is because an abnormality in the notification of the status of a function used for automatic travelling of the vehicle by first notifier 13 and an abnormality in the predetermined notification provided by second notifier 15 have been detected, and there is a possibility that an abnormality has occurred in the equipment which is caused to provide the notification by first notifier 13 and the equipment which is caused to provide the notification by second notifier 15.

It should be noted that when second notifier 15 causes a plurality of equipment (for example, display 34, speaker 36, and the like) to provide the notification, and an abnormality occurs in only some of the equipment, third notifier 22 may cause the equipment, in which no abnormality has occurred among the equipment which is caused to provide the notification by second notifier 15, to provide the notification of the abnormality in the predetermined notification.

In addition, two or more equipment among display 34, lamp 35, and speaker 36 may be provided in one housing, second notifier 15 may cause the equipment (for example, display 34 and the like) in the one housing to provide the notification, and third notifier 22 may cause the equipment (for example, speaker 36 and the like) in the one housing to provide the notification.

It should be noted that third notifier 22 may provide the notification of the status of the function used for automatic travelling. Accordingly, even if an abnormality occurs in the notification of the function used for automatic travelling by first notifier 13, third notifier 22 can provide the notification of the status of the function used for automatic travelling.

It should be noted that although not shown, automatic travelling control system 1 may further include a third abnormality detector which detects an abnormality in the notification provided by third notifier 22, and a fourth notifier which provides a notification when an abnormality in the notification provided by third notifier 22 is detected. Furthermore, automatic travelling control system 1 may include fourth, fifth, and more abnormality detectors and fifth, sixth, and more notifiers, where, for example, the fourth abnormality detector detects an abnormality in the notification by the fourth notifier, the fifth notifier provides notification when an abnormality in the notification by the fourth notifier is detected, and so on.

Next, the operation of automatic travelling control system 1 will be described with reference to FIG. 2.

Figure 2:
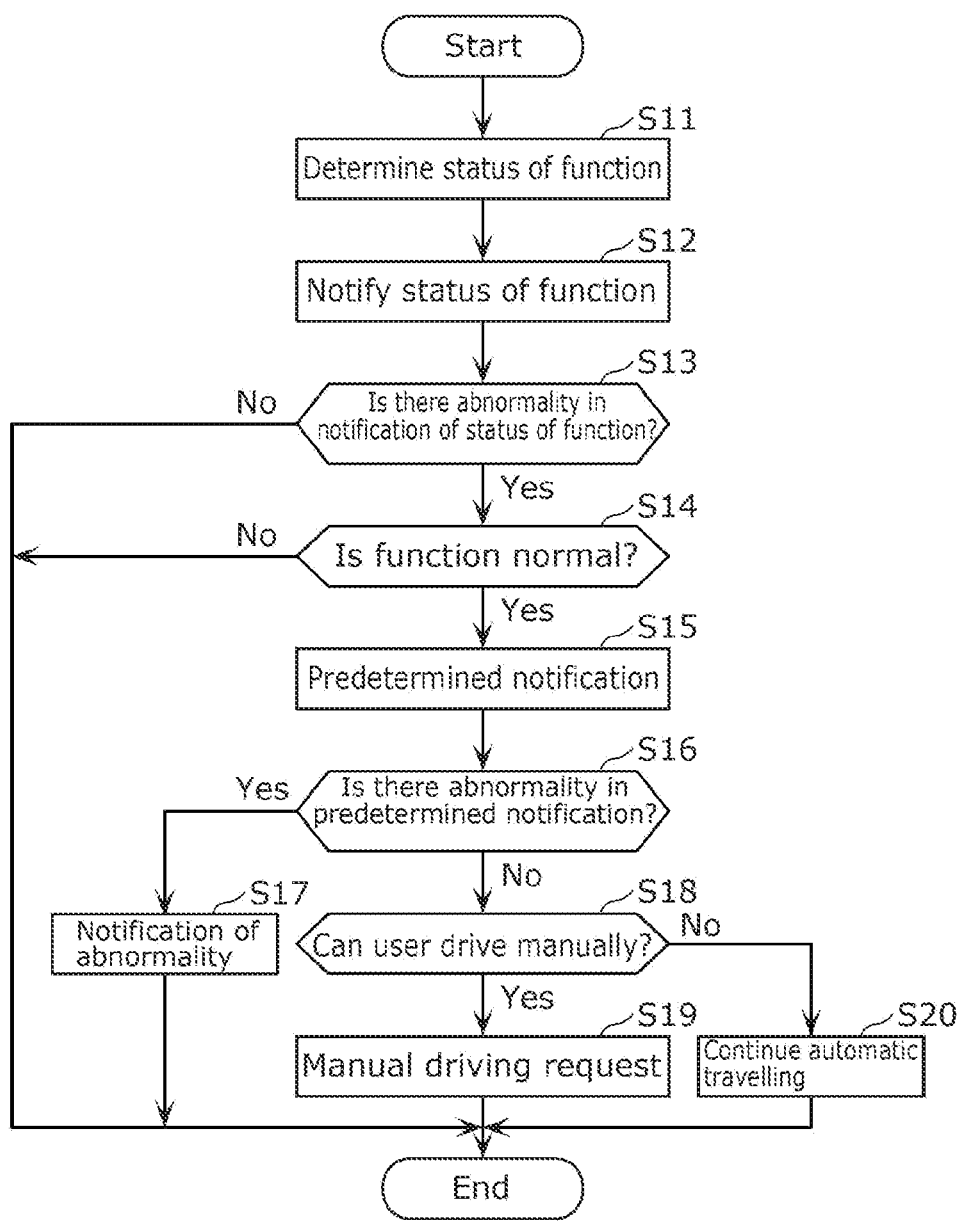
FIG. 2 is a flowchart showing an example of the operation of the automatic travelling control system according to Embodiment 1.

FIG. 2 is a flowchart showing an example of the operation of automatic travelling control system 1 according to Embodiment 1.

First, function determiner 12 determines the status of the function used for automatic travelling of the vehicle (step S11).

Next, first notifier 13 provides a notification of the status of the function used for automatic travelling of the vehicle (step S12). Here, an example of the notification of the status of the function used for automatic travelling of the vehicle will be described with reference to FIG. 3A.

Figure 3A:
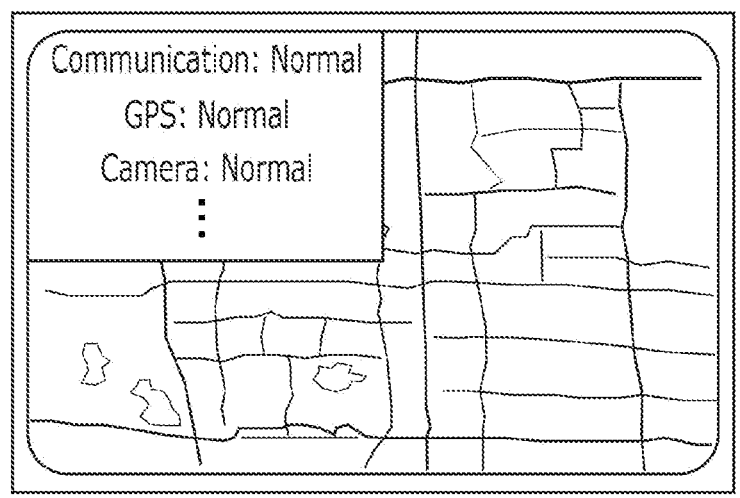
FIG. 3A is a diagram showing an example of a notification of a status of functions used for automatic travelling of a vehicle.

FIG. 3A is a diagram showing an example of a notification of statuses of functions used for automatic travelling of a vehicle.

As shown in FIG. 3A, first notifier 13 causes, for example, the display of the car navigation system to provide the notification of the statuses of the functions used for automatic travelling of the vehicle. In FIG. 3A, as the statuses of the functions used for automatic travelling of the vehicle determined by function determiner 12, the status of the function of communication device 31 to perform wireless communication with the control center and the like, the status of the function of GPS 32 to obtain the position information of the vehicle, and the status of the function of sensor 33 to obtain peripheral information such as obstacles around the vehicle are notified (in FIG. 3A, it is notified that each is normal). It should be noted that the notification of the status of the function used for automatic travelling of the vehicle may be performed by another display 34, lamp 35, speaker 36, or the like.

Returning to the description in FIG. 2, first abnormality detector 14 determines whether there is an abnormality (whether an abnormality is detected) in the status of the function used for automatic travelling of the vehicle (step S13). Here, an example of an abnormality in the notification of the status of a function used for automatic travelling of a vehicle will be described with reference to FIG. 3B.

Figure 3B:
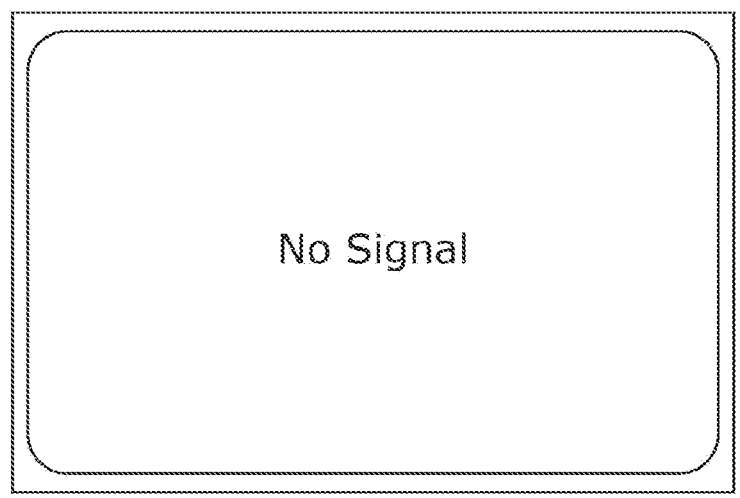
FIG. 3B is a diagram showing an example of an abnormality in a notification of the status of a function used for automatic travelling of a vehicle.

FIG. 3B is a diagram showing an example of an abnormality in a notification of the status of a function used for automatic travelling of a vehicle.

As shown in FIG. 3A, It is assumed that the notification of the status of the function used for automatic travelling of the vehicle is provided, for example, on the display of the car navigation system. When an abnormality occurs in the notification of the status of the function used for automatic travelling of the vehicle, as shown in FIG. 3B, the status of the function used for automatic travelling of the vehicle is not notified on the display of the car navigation system.

Returning to the description in FIG. 2, when there is no abnormality in the notification of the status of the function used for automatic travelling of the vehicle (No in step S13), the status of the function used for automatic travelling of the vehicle can be correctly notified, so that the process ends.

When there is an abnormality in the notification of the status of the function used for automatic travelling of the vehicle (Yes in step S13), function determiner 12 determines whether the function used for automatic travelling of the vehicle is normal (step S14).

When the function used for automatic travelling of the vehicle is abnormal (No in step S14), the process ends. For example, since the function used for automatic travelling of the vehicle is abnormal, automatic travelling controller 11 may reduce the speed of the vehicle or may cause the vehicle to stop in order to reduce the risk due to the abnormality. In addition, automatic travelling control system 1 (for example, third notifier 22) may cause equipment such as display 34, lamp 35, or speaker 36 to provide the notification of the abnormality in the function used for automatic travelling of the vehicle. It should be noted that since an abnormality in the notification of the status of the function used for automatic travelling of the vehicle by first notifier 13 has occurred, automatic travelling control system 1 may cause equipment other than the equipment, which is caused to provide the notification by first notifier 13, to provide the notification of the abnormality in the function used for automatic travelling of the vehicle.

When the function used for automatic travelling of the vehicle is normal (Yes in step S14), second notifier 15 provides a predetermined notification (step S15). Here, an example of the predetermined notification will be described with reference to FIG. 4A and FIG. 4B.

Figure 4A:
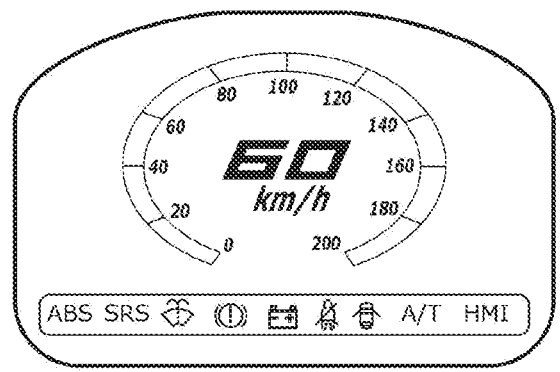
FIG. 4A is a diagram showing an example of equipment by which a predetermined notification is provided.
Figure 4B:
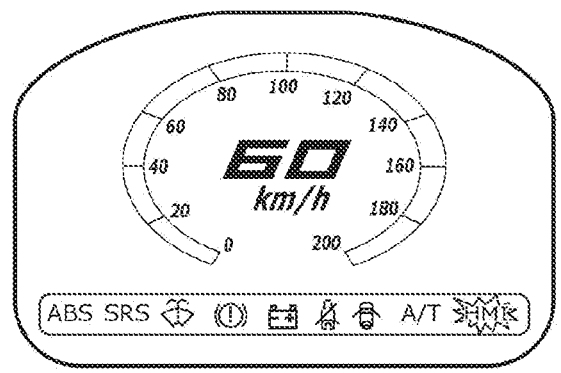
FIG. 4B is a diagram showing an example of a predetermined notification.

FIG. 4A is a diagram showing an example of equipment which provides a predetermined notification. FIG. 4B is a diagram showing an example of the predetermined notification.

As shown in FIG. 4A, second notifier 15 causes an IC display such as a speedometer to provide a predetermined notification. As shown in FIG. 4B, the predetermined notification may be, for example, blinking the characters "HMI". It should be noted that when the predetermined notification is not provided, the characters "HMI" do not blink as shown in FIG. 4A. In addition, the predetermined notification may be provided by another display 34, lamp 35, speaker 36, or the like. Since an abnormality has occurred in the notification of the status of the function used for automatic travelling of the vehicle by first notifier 13, second notifier 15 may cause equipment other than the equipment, which is caused to provide the notification by first notifier 13, to provide the predetermined notification.

Returning to the description in FIG. 2, second abnormality detector 21 determines whether there is an abnormality (whether an abnormality has been detected) in the predetermined notification (step S16). When an abnormality in the predetermined notification occurs, for example, the characters "HMI" do not blink as shown in FIG. 4A, even if an abnormality occurs in the notification of the status of the function used for automatic travelling of the vehicle.

When there is an abnormality in the predetermined notification (Yes in step S16), third notifier 22 provides a notification of the abnormality in the predetermined notification (step S17). Accordingly, the user on board the vehicle can recognize the abnormality in the predetermined notification.

It should be noted that third notifier 22 may provide the notification by means according to the type of the equipment which is caused to provide the notification.

For example, when the type of the equipment is display 34, third notifier 22 provides the notification by characters. In addition, since various sizes of displays exist for display 34, third notifier 22 may provide the notification according to the number of characters or the character size according to the size of display 34.

For example, when the type of the equipment is lamp 35, third notifier 22 provides the notification according to the number of blinks or the color emitted of lamp 35.

For example, when the type of the equipment is speaker 36, third notifier 22 provides the notification by sound.

In this way, as equipment which is caused to provide the notification, there are lamp 35, speaker 36, various sizes of displays 34, and the like, and it is difficult to provide the notification thereto by a uniform means, but by providing the notification of the abnormality in the function used for automatic travelling by means according to the type of equipment, it is possible to cause various equipment to provide the notification.

In addition, as described above, the means according to the type of the equipment which is caused to provide the notification may include the sound by speaker 36 and the display by display 34, and third notifier 22 may provide the notification by sound or display depending on the content of the notification. Specifically, third notifier 22 may provide the notification of the abnormality in the function used for automatic travelling by the display, and may provide the notification of the abnormality in the predetermined notification by the sound. It should be noted that the display may be a display by lamp 35 or the like.

In addition, depending on the equipment (for example, display 34 having a small size, or the like) for being caused to provide the notification, the amount of information that can be notified is limited, and when there are a plurality of contents of the notification, it may not be possible to notify the plurality of contents of the notification at the same time. Therefore, the content of the notification provided by third notifier 22 may be associated with a priority, and third notifier 22 may provide the notification according to the priority. Accordingly, it is possible to preferentially notify the content of the notification having a high priority.

In addition, automatic travelling control system 1 may notify the mobile terminal owned by the user on board the vehicle that an abnormality in the predetermined notification has occurred, notify the call center, or notify the person concerned (family, acquaintance, or the like) of the user on board the vehicle. In addition, automatic travelling control system 1 may notify peripheral vehicles and the like outside the vehicle that an abnormality in the predetermined notification has occurred.

If there is no abnormality in the predetermined notification (No in step S16), manual driving capability determiner 16 determines whether the user on board the vehicle is capable of driving the vehicle manually (step S18). This determination can be made as follows.

First, manual driving capability determiner 16 determines whether the user on board the vehicle holds a driver's license. The determination can be made based on the user's attribute information included in the information received from the control center.

Next, manual driving capability determiner 16 determines whether the user on board the vehicle is in a position where manual driving is possible. The determination can be made based on an image obtained by taking an image of the vehicle interior with a camera provided in the vehicle interior. Specifically, manual driving capability determiner 16 can determine that the user is in a position where manual driving is possible if the user on board the vehicle is in a position where the accelerator, brake, steering wheel, and the like can be operated.

Then, manual driving capability determiner 16 determines that the user is capable of driving the vehicle manually when the user on board the vehicle holds a driver's license and is in a position where manual driving is possible. Manual driving capability determiner 16 can determine that the user is not capable of driving the vehicle manually if the user on board the vehicle does not have a driver's license or is not in a position where manual driving is possible.

When the user on board the vehicle is capable of manual driving (Yes in step S18), manual driving requester 17 requests the user to drive the vehicle manually (step S19). When manual driving (operation of the accelerator, brake, steering wheel, or the like) is performed within a predetermined time period after the user is requested to drive the vehicle manually, automatic travelling controller 11 ends the automatic travelling control of the vehicle.

When the user on board the vehicle is not capable of manual driving (No in step S18), automatic travelling controller 11 continues the automatic travelling of the vehicle (step S20). At this time, it may be notified that the automatic travelling of the vehicle is continued.

As described above, according to automatic travelling control system 1 in Embodiment 1, since the abnormality in the predetermined notification is detected, it is possible to deal with the abnormality in the predetermined notification.

Embodiment 2

Hereinafter, the automatic travelling control system according to Embodiment 2 will be described with reference to the drawings.

Figure 5:
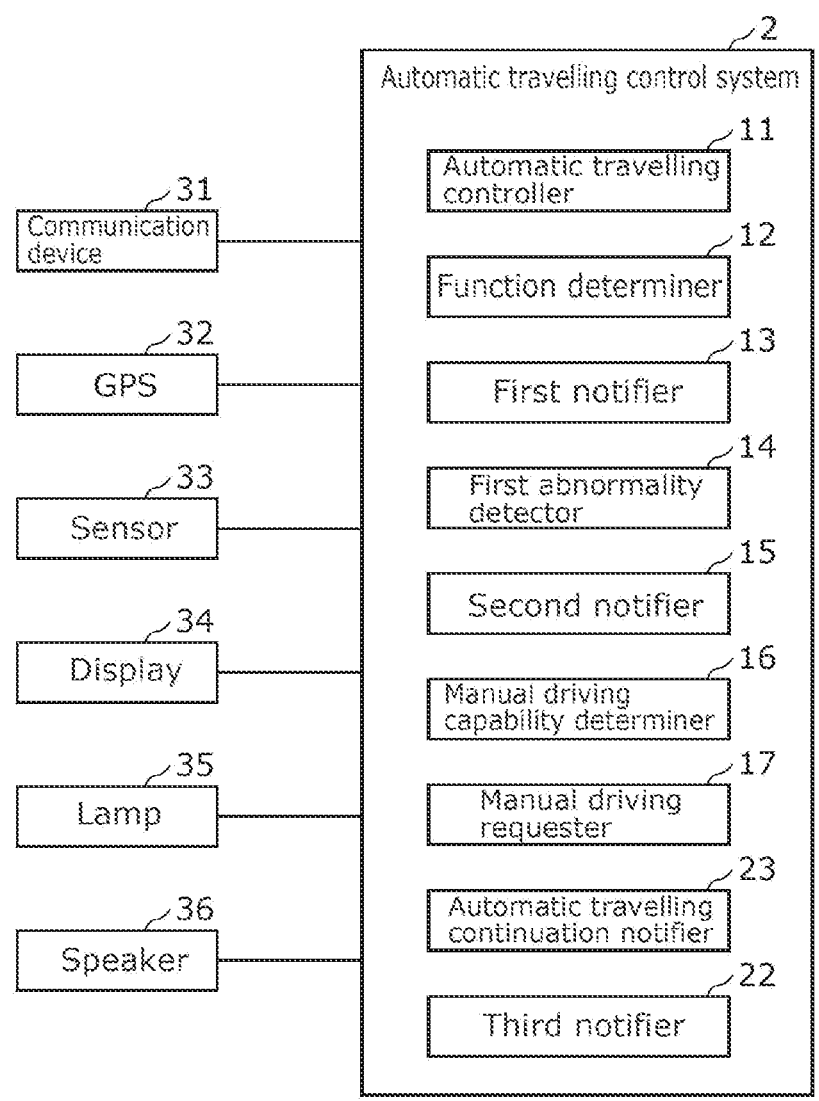
FIG. 5 is a configuration diagram showing an example of an automatic travelling control system according to Embodiment 2.

FIG. 5 is a configuration diagram showing an example of automatic travelling control system 2 according to Embodiment 2. It should be noted that FIG. 5 also shows communication device 31, GPS 32, sensor 33, display 34, lamp 35, and speaker 36. Communication device 31, GPS 32, sensor 33, display 34, lamp 35, and speaker 36 may be included in automatic travelling control system 2. Communication device 31, GPS 32, sensor 33, display 34, lamp 35 and speaker 36 are mounted on the vehicle.

Since communication device 31, GPS 32, sensor 33, display 34, lamp 35, and speaker 36 are the same as those in Embodiment 1, the description thereof will be omitted.

Automatic travelling control system 2 is a system for controlling the automatic travelling of the vehicle, and includes automatic travelling controller 11, function determiner 12, first notifier 13, first abnormality detector 14, second notifier 15, manual driving capability determiner 16, manual driving requester 17, automatic travelling continuation notifier 23, and third notifier 22. Automatic travelling control system 2 is a computer including a processor, a memory, and the like. The memory is a ROM, RAM, or the like, and can store a program executed by the processor. Automatic driving controller 11, function determiner 12, first notifier 13, first abnormality detector 14, second notifier 15, manual driving capability determiner 16, manual driving requester 17, automatic travelling continuation notifier 23 and third notifier 22 are realized by a processor or the like that executes a program stored in the memory. Automatic travelling control system 2 may be a device mounted on a vehicle. In this case, the components included in automatic travelling control system 2 may be arranged in one device (one housing), or may be distributed and arranged in a plurality of devices in the vehicle. In addition, automatic travelling control system 2 may be a server provided outside the vehicle. In this case, the components included in automatic travelling control system 2 may be distributed and arranged in a plurality of servers. For example, when automatic travelling control system 2 is a control center (for example, a server), the vehicle wirelessly communicates with automatic travelling control system 2 via communication device 31. In addition, when automatic travelling control system 2 is mounted on the vehicle, automatic travelling control system 2 wirelessly communicates with the control center via communication device 31. In addition, the components included in automatic travelling control system 2 may be distributed and arranged in the device inside the vehicle and the server provided outside the vehicle.

Since the basic functions of automatic travelling controller 11, function determiner 12, first notifier 13, first abnormality detector 14, second notifier 15, manual driving capability determiner 16, and manual driving requester 17 are the same as those in Embodiment 1, the description thereof will be omitted.

Automatic travelling continuation notifier 23 provides a notification of the continuation of automatic travelling when it is determined that the user is not capable of driving the vehicle manually. Alternatively, automatic travelling continuation notifier 23 provides a notification of the continuation of automatic travelling when the manual driving is not started after the user is requested to drive the vehicle manually. For example, automatic travelling continuation notifier 23 causes equipment such as display 34, lamp 35, or speaker 36 to provide the notification of the continuation of automatic travelling. Automatic travelling continuation notifier 23 may cause equipment other than the equipment, which is caused to provide the notification by first notifier 13, to provide the notification of the continuation of automatic travelling. This is because an abnormality has been detected in the notification of the status of the function used for automatic travelling of the vehicle by first notifier 13, and there is a possibility that an abnormality has occurred in the equipment which is caused to provide the notification by first notifier 13.

It should be noted that when first notifier 13 causes a plurality of equipment (for example, display 34 and speaker 36) to provide the notification, and an abnormality occurs in only some of the equipment, automatic travelling continuation notifier 23 may cause the equipment, in which no abnormality has occurred among the equipment which is caused to provide the notification by first notifier 13, to provide a predetermined notification.

Third notifier 22 provides a notification of the abnormality in the function used for automatic travelling of the vehicle when it is determined that the function used for automatic travelling of the vehicle is abnormal during the continuation of the automatic travelling of the vehicle. It should be noted that automatic travelling controller 11 continues the automatic travelling of the vehicle when second notifier 15 provides a predetermined notification and it is determined that the user is not capable of driving the vehicle manually. Alternatively, automatic travelling controller 11 continues the automatic travelling of the vehicle when the manual driving is not started after the user is requested to drive the vehicle manually. For example, third notifier 22 causes equipment such as display 34, lamp 35, or speaker 36 to provide the notification of an abnormality in a function used for automatic travelling of a vehicle. Third notifier 22 may cause equipment other than the equipment, which is caused to provide the notification by first notifier 13, to provide the notification of the abnormality in the function used for automatic travelling of the vehicle. This is because an abnormality has been detected in the notification of the status of the function used for automatic travelling of the vehicle by first notifier 13, and there is a possibility that an abnormality has occurred in the equipment which is caused to provide the notification by first notifier 13.

It should be noted that when first notifier 13 causes a plurality of equipment (for example, display 34 and speaker 36) to provide the notification, and an abnormality occurs in only some of the equipment, third notifier 22 may cause the equipment, in which no abnormality has occurred among the equipment which is caused to provide the notification by first notifier 13, to provide a predetermined notification.

For example, when the equipment which is caused to provide the notification by second notifier 15 is equipment which is also capable of providing a notification of an abnormality in the function used for automatic travelling of the vehicle, third notifier 22 may cause the equipment to provide the notification of an abnormality in the function has a function used for automatic travelling of the vehicle.

In addition, automatic travelling control system 2 may include second abnormality detector 21 for detecting an abnormality in a predetermined notification, and third notifier 22 may provide the notification of an abnormality in the predetermined notification when an abnormality in the predetermined notification is detected. For example, third notifier 22 causes equipment such as display 34, lamp 35, or speaker 36 to provide the notification of an abnormality in the predetermined notification. Third notifier 22 may cause equipment other than the equipment, which is caused to provide the notification by first notifier 13, and the equipment, which is caused to provide the notification by second notifier 15, to provide the notification of the abnormality in the predetermined notification. This is because an abnormality in the notification of the status of a function used for automatic travelling of a vehicle by first notifier 13 and an abnormality in the predetermined notification provided by second notifier 15 are detected, and there is a possibility that an abnormality has occurred in the equipment which is caused to provide the notification by first notifier 13, and the equipment which is caused to provide the notification by second notifier 15.

It should be noted that when second notifier 15 causes a plurality of equipment (for example, display 34 and speaker 36) to provide the notification, and an abnormality occurs in only some of the equipment, third notifier 22 may cause the equipment, in which no abnormality has occurred among the equipment which is caused to provide the notification by second notifier 15, to provide a predetermined notification.

In addition, two or more equipment among display 34, lamp 35, and speaker 36 may be provided in one housing, second notifier 15 may cause the equipment (for example, display 34) in the one housing to provide the notification, and third notifier 22 may cause the equipment (for example, speaker 36 and the like) in the one housing to provide the notification.

It should be noted that although not shown, automatic travelling control system 2 may further include a third abnormality detector that detects an abnormality in the notification provided by third notifier 22, and a fourth notifier for providing a notification when an abnormality in the notification provided by third notifier 22 is detected. Furthermore, automatic travelling control system 2 may include fourth, fifth, and more abnormality detectors and fifth, sixth, and more notifiers, where, for example, the fourth abnormality detector detects an abnormality in the notification provided by the fourth notifier, the fifth notifier provides a notification when an abnormality in the notification provided by the fourth notifier is detected, and so on.

Next, the operation of automatic travelling control system 2 will be described with reference to FIG. 6.

Figure 6:
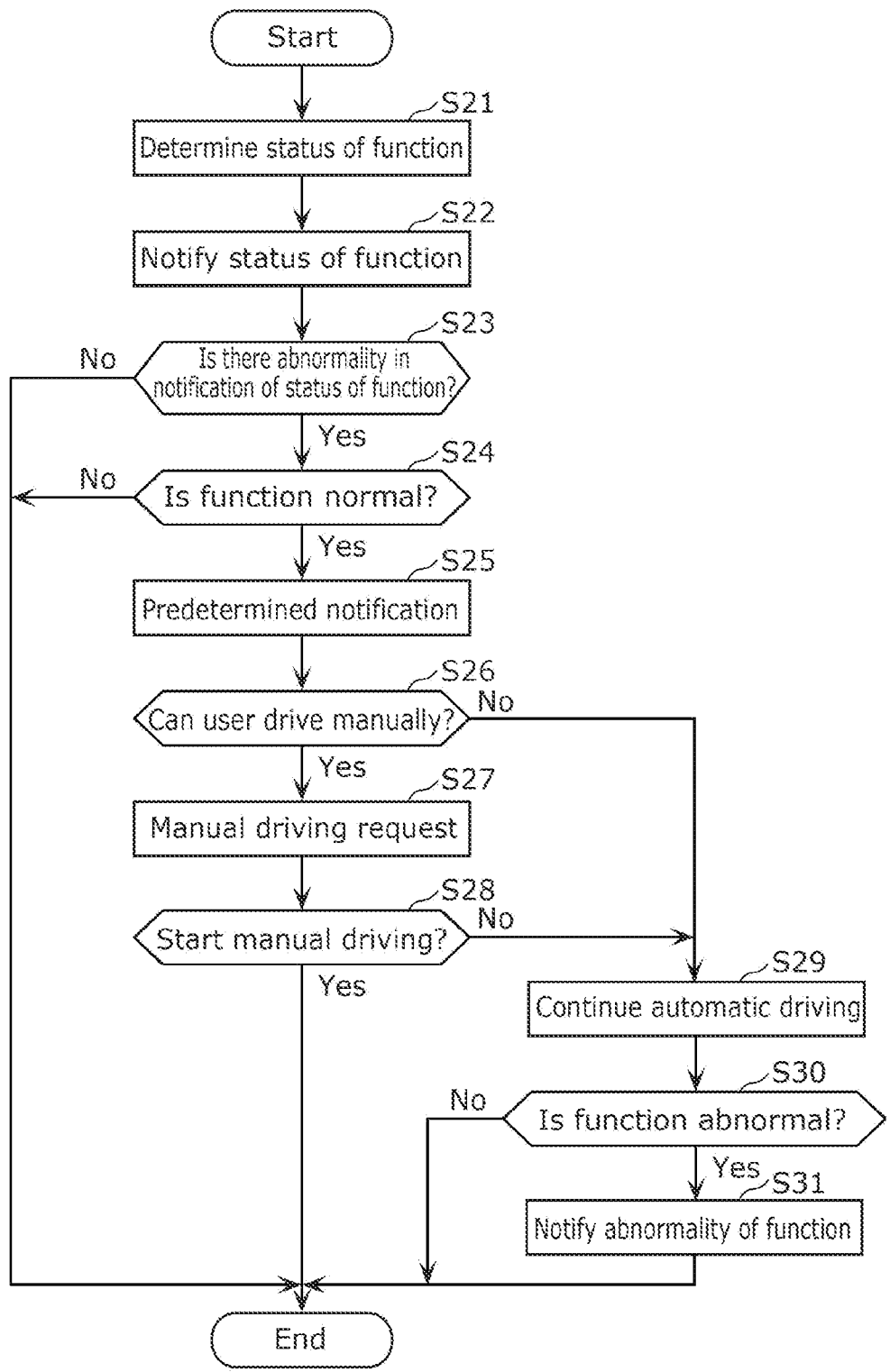
FIG. 6 is a flowchart showing an example of the operation of the automatic travelling control system according to Embodiment 2.

FIG. 6 is a flowchart showing an example of the operation of automatic travelling control system 2 according to Embodiment 2.

Since the processing from step S21 to step S25 is the same as the processing from step S11 to step S15 in Embodiment 1, the description thereof will be omitted.

Manual driving capability determiner 16 determines whether the user on board the vehicle is capable of driving the vehicle manually (step S26). This determination can be made as follows.

First, manual driving capability determiner 16 determines whether the user on board the vehicle holds a driver's license. The determination can be made based on the user's attribute information included in the information received from the control center.

Next, manual driving capability determiner 16 determines whether the user on board the vehicle is in a position where manual driving is possible. The determination can be made based on an image obtained by taking an image of the vehicle interior with a camera provided in the vehicle interior. Specifically, manual driving capability determiner 16 can determine that the user is in a position where manual driving is possible if the user on board the vehicle is in a position where the accelerator, brake, steering wheel, and the like can be operated.

Then, manual driving capability determiner 16 can determine that the user is capable of driving the vehicle manually when the user on board the vehicle holds a driver's license and is in a position where manual driving is possible. Manual driving capability determiner 16 can determine that the user is not capable of driving the vehicle manually when the user on board the vehicle does not have a driver's license or is not in a position where manual driving is possible.

When the user on board the vehicle is capable of manual driving (Yes in step S26), manual driving requester 17 requests the user to drive the vehicle manually (step S27).

Automatic travelling controller 11 determines whether the manual driving (operation of the accelerator, brake, steering wheel, or the like) is started within a predetermined time period after the user is requested to drive the vehicle manually (step S28). When the manual driving is started (Yes in step S28), automatic travelling controller 11 ends the automatic travelling control of the vehicle.

When the user on board the vehicle is not capable of manual driving (No in step S26), or when the manual driving is not started (No in step S28), automatic travelling controller 11 continues the automatic travelling of the vehicle (step S29). At this time, automatic travelling continuation notifier 23 may notify that the automatic travelling of the vehicle is continued.

Next, function determiner 12 determines whether the function used for automatic travelling of the vehicle has become abnormal during the continuation of the automatic travelling of the vehicle in step S29 (step S30). That is, function determiner 12 determines whether the function used for automatic travelling of the vehicle has become abnormal when the automatic travelling of the vehicle is continued even after the predetermined notification is provided.

When the function used for automatic travelling of the vehicle does not become abnormal during the continuation of the automatic travelling of the vehicle (No in step S30), the process ends (for example, the automatic travelling is continued).

When the function used for automatic travelling of the vehicle becomes abnormal during the continuation of automatic travelling of the vehicle (Yes in step S30), third notifier 22 notifies the abnormality in the function used for automatic travelling of the vehicle (step S31). Since an abnormality in the notification of the status of the function used for automatic travelling of the vehicle by first notifier 13 has occurred, the user on board the vehicle cannot recognize the status of the function used for automatic travelling of the vehicle depending on the notification provided by third notifier 22, but can recognize the abnormality in the function used for automatic travelling of the vehicle depending on the notification provided by third notifier 22 which is different from first notifier 13.

It should be noted that third notifier 22 may provide the notification of the abnormality in the function used for automatic travelling of the vehicle by means according to the type of the equipment which is caused to provide the notification of the abnormality in the function used for automatic travelling of the vehicle.

For example, when the type of the equipment is display 34, third notifier 22 provides a notification of the abnormality in the function used for automatic travelling of the vehicle by characters. In addition, since various sizes of displays exist in display 34, third notifier 22 may provide the notification of the abnormality in the function used for automatic travelling of the vehicle by the number of characters or the character size according to the size of display 34.

For example, when the type of the equipment is lamp 35, third notifier 22 provides a notification of the abnormality in the function used for automatic travelling of the vehicle by the number of blinks or the color emitted of lamp 35.

For example, when the type of the equipment is speaker 36, third notifier 22 provides a notification of the abnormality in the function used for automatic travelling of the vehicle by sound.

In this way, as equipment which is caused to provide the notification, there are lamp 35, speaker 36, displays 34 of various sizes, and the like, and it is difficult to provide the notification thereto by a uniform means, but by providing the notification of the abnormality in the function used for automatic travelling by means according to the type of equipment, it is possible to cause various equipment to provide the notification.

In addition, as described above, the means according to the type of the equipment which is caused to provide the notification may include the sound by speaker 36 and the display by display 34, and third notifier 22 may provide the notification by sound or display depending on the content of the notification. It should be noted that the display may be a display by lamp 35 or the like.

In addition, the amount of information that can be notified is limited depending on the equipment which is caused to provide the notification (for example, a small-sized display 34 and the like), and when an abnormality occurs in a plurality of types of the functions used for automatic travelling, it may not be possible to notify the abnormalities in the plurality of types of the functions at the same time. For example, it may not be possible to notify an important function used for automatic travelling of a vehicle, such as a function related to braking. Therefore, a priority may be associated with each of the functions used for automatic travelling of a plurality of types of the vehicles, and third notifier 22 may provide the notification of the abnormality in the function used for automatic travelling of the vehicle according to the priority. Accordingly, it is possible to preferentially notify an abnormality in a function having a high priority.

In addition, the function used for automatic travelling of the vehicle includes a function that the importance changes depending on the travelling status of the vehicle. For example, the human detection function, the signal detection function, the stop line detection function, and the like are of high importance when the vehicle is travelling on a general road, but on a highway, people, traffic lights, stop lines, or the like does not basically exist, so that they are of low importance when the vehicle is driving on the highway. Therefore, a plurality of types of the functions used for automatic travelling of the vehicle may include functions to which different priorities are associated according to the travelling status of the vehicle, and third notifier 22 may provide the notification of the abnormalities in the functions used for automatic travelling of the vehicle according to the priority and the travelling status of the vehicle. Accordingly, it is possible to preferentially provide the notification of the abnormality in the function used for automatic travelling, which has a high priority. It should be noted that the travelling status of the vehicle can be estimated from the speed or position of the vehicle.

In addition, automatic travelling control system 2 may notify the mobile terminal owned by the user on board the vehicle that an abnormality in the function used for automatic travelling of the vehicle has occurred, notify the call center, or notify the person concerned (family, acquaintance, or the like) of the user on board the vehicle. In addition, automatic travelling control system 2 may notify peripheral vehicles and the like outside the vehicle that an abnormality in the function used for automatic travelling of the vehicle has occurred.

In addition, for example, since the function used for automatic travelling of the vehicle is abnormal, automatic travelling controller 11 may reduce the speed of the vehicle or may cause the vehicle to stop in order to reduce the risk due to the abnormality.

As described above, according to automatic travelling control system 2 in Embodiment 2, when it is determined that the function used for automatic travelling is abnormal during the continuation of the automatic travelling of the vehicle after the abnormality in the notification of the status of the function used for automatic travelling is notified, the abnormality in the function used for automatic travelling is notified. For this reason, even if an abnormality in the function used for automatic travelling occurs during the continuation of the automatic travelling of the vehicle after the abnormality in the notification of the status of the function used for automatic travelling is notified, the user can deal with the abnormality in the function used for automatic travelling.

Other Embodiments

As described above, the embodiments have been described as examples of the technology according to the present disclosure. However, the technology according to the present disclosure is not limited thereto, and can also be applied to embodiments in which changes, replacements, additions, omissions, or the like are made as appropriate. For example, the following variations are also included in embodiments of the present disclosure.

For example, in Embodiment 1 described above, the example in which automatic travelling control system 1 includes third notifier 22 has been described, but automatic travelling control system 1 may not include third notifier 22.

For example, the present disclosure can be realized not only as automatic travelling control system 1 but also as an automatic travelling control method including steps (processes) performed by each component included in automatic travelling control system 1.

Specifically, as shown in FIG. 2, the automatic travel control method includes a function determination step (step S11) for determining whether a function used for automatic travelling of a vehicle is normal; a notification step (step S12) for providing a notification of a status of the function; a first abnormality detection step (step S13) for detecting an abnormality in the notification of the status of the function; a second notification step (step S15) for providing a predetermined notification when the abnormality in the notification of the status of the function is detected and it is determined that the function is normal (Yes in step S13 and Yes in step S14); a second abnormality detection step (step S16) for detecting an abnormality in the predetermined notification; a manual driving capability determination step (step S18) for determining whether the user on board the vehicle is capable of driving the vehicle manually; and a manual driving request step (step S19) for requesting the user to drive the vehicle manually when the predetermined notification is provided in the second notification step, and it is determined that the user is capable of driving the vehicle manually (Yes in step S18).

For example, in Embodiment 2 described above, the example in which automatic travelling control system 2 includes automatic travelling continuation notifier 23 has been described, but automatic travelling control system 1 may not include automatic travelling continuation notifier 23.

For example, the present disclosure can be realized not only as automatic travelling control system 2 but also as an automatic travelling control method including steps (processes) performed by each component included in automatic travelling control system 2.

Specifically, as shown in FIG. 6, the automatic travelling control method includes a function determination step (step S21) for determining whether a function used for automatic travelling of a vehicle is normal; a notification step (step S22) for providing a notification of a status of the function; a first abnormality detection step (step S23) for detecting an abnormality in the notification of the status of the function; a second notification step (step S25) for providing a predetermined notification when the abnormality in the notification of the status of the function is detected and it is determined that the function is normal (Yes in step S23 and Yes in step S24); a manual driving capability determination step (step S26) for determining whether the user on board the vehicle is capable of driving the vehicle manually; a manual driving request step (step S27) for requesting the user to drive the vehicle manually when the predetermined notification is provided in the second notification step, and it is determined that the user is capable of driving the vehicle manually (Yes in step S26); an automatic travelling continuation step (step S29) for continuing the automatic travelling of the vehicle when the predetermined notification is provided in the second notification step, and it is determined that the user is not capable of driving the vehicle manually (No in step S26), or when the manual driving is not started after the user is requested to drive the vehicle manually (No in step S28); and a third notification step (step S31) for notifying the abnormality in the function when it is determined that the function is abnormal during the continuation of the automatic travelling of the vehicle in the automatic travelling continuation step (Yes in step S30).

For example, the steps in the automatic travelling control method may be executed by a computer (computer system). Then, the present disclosure can be realized as a program for causing a computer to execute the steps included in the automatic travelling control method.

Furthermore, the present disclosure can be realized as a non-transitory computer-readable recording medium such as a CD-ROM having the program recorded thereon.

For example, when the present disclosure is realized by a program (software), each step is executed by executing the program using hardware resources such as a CPU, a memory, and an input/output circuit of a computer. That is, each step is executed by the CPU obtaining data from the memory, the input/output circuit or the like to calculate the data, or outputting the calculated result to the memory, the input/output circuit or the like.

In addition, each component included in automatic travelling control systems 1 and 2 of the above embodiments may be realized as a dedicated or general-purpose circuit.

In addition, each component included in automatic travelling control systems 1 and 2 of the above embodiments may be realized as a large scale integration (LSI) which is an integrated circuit (IC).

In addition, the integrated circuit is not limited to the LSI, and may be realized by a dedicated circuit or a general-purpose processor. A programmable field programmable gate array (FPGA) or a reconfigurable processor in which the connections and settings of circuit cells inside the LSI can be reconfigured may be used.

Furthermore, when circuit integration technology that replaces LSIs comes along owing to advances of the semiconductor technology or to a separate derivative technology, each component included in automatic travelling control systems 1 and 2 may understandably be integrated using that technology.

In addition, forms obtained by applying various modifications to each embodiment conceived by a person skilled in the art or forms realized by arbitrarily combining the components and functions in each embodiment without departing from the spirit of the present disclosure are also included in this disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2021-058250 filed on Mar. 30, 2021, and Japanese Patent Application No. 2021-058276 filed on Mar. 30, 2021.

INDUSTRIAL APPLICABILITY

This disclosure can be applied to a system that controls the automatic travelling of a vehicle, and the like.

The invention claimed is:

1. An automatic travelling control system, comprising:
an automatic travelling controller that controls automatic travelling of a vehicle;
a function determiner that determines a status of a function used for the automatic travelling of the vehicle;
a first notifier that provides a notification of the status of the function;
a first abnormality detector that detects a first abnormality in the notification of the status of the function;
the automatic travelling controller that reduces, in the automatic travelling, a speed of the vehicle when the first abnormality in the notification of the status of the function is detected and the function is determined as being abnormal;
a second notifier that provides a predetermined notification when the first abnormality in the notification of the status of the function is detected and the function is determined as being normal;
a second abnormality detector that detects a second abnormality in the predetermined notification and that detects where the second abnormality occurs in the predetermined notification by checking signals processed by electronic control units of the vehicle, the electronic control units being related to a communication device of the vehicle, a global positioning system of the vehicle, and a sensor of the vehicle;
a manual driving capability determiner that determines whether a user on board the vehicle is capable of driving the vehicle manually; and
a manual driving requester that requests the user to drive the vehicle manually when the second notifier provides the predetermined notification and the manual driving capability determiner determines that the user is capable of driving the vehicle manually,
wherein the second abnormality detector, in detecting where the second abnormality occurs in the predetermined notification by checking the signals processed by the electronic control units, at least related to the communication device, the global positioning system, and the sensor, detects that the second abnormality occurs in a process of providing, transmitting, and outputting the predetermined notification, the second abnormality occurring in at least one of: equipment providing the predetermined notification; an output that outputs the predetermined notification; or
a transmission path between the equipment and the output.

2. The automatic travelling control system according to claim 1, further comprising:
a third notifier that provides a second notification when the second abnormality in the predetermined notification is detected.

3. The automatic travelling control system according to claim 2,
wherein the third notifier provides the second notification of the second abnormality in the predetermined notification.

4. The automatic travelling control system according to claim 2,
wherein the third notifier provides the second notification of the status of the function.

5. The automatic travelling control system according to claim 2,
wherein a priority is associated with a content of the second notification provided by the third notifier, and the third notifier provides the second notification according to the priority.

6. The automatic travelling control system according to claim 2,
wherein the third notifier provides the second notification according to a type of equipment which is caused to provide the second notification.

7. The automatic travelling control system according to claim 6,
wherein the second notification includes one of sound or display, and
the third notifier provides the second notification by the one of the sound or the display depending on a content of the second notification.

8. The automatic travelling control system according to claim 2, further comprising:
a third abnormality detector that detects a third abnormality in the second notification provided by the third notifier.

9. The automatic travelling control system according to claim 8, further comprising:
a fourth notifier that provides a third notification when the third abnormality in the second notification provided by the third notifier is detected.

10. An automatic travelling control method for an automatic travelling control system, the automatic travelling control method comprising:
determining whether a function used for automatic travelling of a vehicle is normal;
providing a notification of a status of the function;
detecting a first abnormality in the notification of the status of the function;
reducing, in the automatic travelling, a speed of the vehicle when the first abnormality in the notification of the status of the function is detected and the function is determined as being abnormal;
providing a predetermined notification when the first abnormality in the notification of the status of the function is detected and the function is determined as being normal;
detecting a second abnormality in the predetermined notification and detecting where the second abnormality occurs in the predetermined notification by checking signals processed by electronic control units of the vehicle, the electronic control units being related to a communication device of the vehicle, a global positioning system of the vehicle, and a sensor of the vehicle;
determining whether a user on board the vehicle is capable of driving the vehicle manually; and
requesting the user to drive the vehicle manually when the predetermined notification is provided in the providing of the predetermined notification and the determining of whether the user is capable of driving the vehicle manually determines that the user is capable of driving the vehicle manually,
wherein, in the detecting of where the second abnormality occurs in the predetermined notification by checking the signals processed by the electronic control units, related to the communication device, the global positioning system, and the sensor, the automatic travelling control method detects that the second abnormality occurs in a process of providing, transmitting, and outputting the predetermined notification, the second abnormality occurring in at least one of: equipment providing the predetermined notification; an output that outputs the predetermined notification; or a transmission path between the equipment and the output.

11. A computer-readable non-transitory recording medium having recorded thereon a program for causing a computer to execute the automatic travelling control method according to claim 10.

12. The automatic travelling control system according to claim 1, wherein
the second abnormality detector detects whether the second abnormality occurs in the at least one of: the equipment providing the predetermined notification; the output, including the second notifier, that outputs the predetermined notification; or the transmission path between the equipment and the output.

13. The automatic travelling control method according to claim 10, further comprising:
detecting whether the second abnormality occurs in the at least one of: the equipment providing the predetermined notification; the output that outputs the predetermined notification;
or the transmission path between the equipment and the output.

14. An automatic travelling control system, comprising:
a processor; and
a memory including a program that, when executed by the processor, causes the processor to perform operations, the operations including:
controlling automatic travelling of a vehicle;
determining a status of a function used for the automatic travelling of the vehicle;
providing a notification of the status of the function;
detecting a first abnormality in the notification of the status of the function;
reducing, in the automatic travelling, a speed of the vehicle when the first abnormality in the notification of the status of the function is detected and the function is determined as being abnormal;
providing a predetermined notification when the first abnormality in the notification of the status of the function is detected and the function is determined as being normal;
detecting a second abnormality in the predetermined notification and detecting where the second abnormality occurs in the predetermined notification by checking signals processed by electronic control units of the vehicle, the electronic control units being related to a communication device of the vehicle, a global positioning system of the vehicle, and a sensor of the vehicle;
determining whether a user on board the vehicle is capable of driving the vehicle manually; and
requesting the user to drive the vehicle manually when the predetermined notification is provided and the user is determined to be capable of driving the vehicle manually,
wherein the processor, in detecting where the second abnormality occurs in the predetermined notification by checking the signals processed by the electronic control units, related to the communication device, the global positioning system, and the sensor, detects that the second abnormality occurs in a process of providing, transmitting, and outputting the predetermined notification, the second abnormality occurring in at least one of: equipment providing the predetermined notification; an output that outputs the predetermined notification; or a transmission path between the equipment and the output.

\* \* \* \* \*